United States Patent
Remes

(10) Patent No.: US 9,874,490 B2
(45) Date of Patent: Jan. 23, 2018

(54) METHOD AND SYSTEM FOR DETECTING FLUID LEAK VIA A STRAIN GAUGE

(71) Applicant: Ford Global Technologies, LLC, Dearborn, MI (US)

(72) Inventor: Enrique Remes, Huixquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 14/731,067

(22) Filed: Jun. 4, 2015

(65) Prior Publication Data

US 2016/0356668 A1 Dec. 8, 2016

(51) Int. Cl.
*G01M 3/40* (2006.01)
*G01M 15/02* (2006.01)

(52) U.S. Cl.
CPC ............. *G01M 3/40* (2013.01); *G01M 15/02* (2013.01)

(58) Field of Classification Search
CPC ........ G01M 3/40; G01M 15/02; G01M 15/14; G01M 3/16; G01M 17/00; G01M 15/00
USPC .......................................... 73/40.5 R, 40, 46
See application file for complete search history.

(56) References Cited

U.S. PATENT DOCUMENTS

| | | | |
|---|---|---|---|
| 2,813,709 A | 11/1957 | Brier | |
| 3,499,500 A | 3/1970 | Harding | |
| 4,015,326 A | 4/1977 | Brewer | |
| 5,067,094 A * | 11/1991 | Hayes | G01M 3/2876 340/605 |
| 5,435,185 A | 7/1995 | Eagan | |
| 2002/0164254 A1* | 11/2002 | Yoshimura | F04C 29/0014 417/313 |
| 2010/0074572 A1* | 3/2010 | Zheng | F01D 17/02 385/13 |
| 2010/0219334 A1* | 9/2010 | Legrand | E21B 47/10 250/256 |
| 2011/0139130 A1* | 6/2011 | Siddiqui | F02M 25/0818 123/520 |
| 2013/0014595 A1* | 1/2013 | Huizinga | B60T 17/22 73/862.045 |
| 2013/0280043 A1* | 10/2013 | Parnin | F01D 25/18 415/118 |
| 2014/0190241 A1* | 7/2014 | Namou | G01L 1/2262 73/40 |
| 2014/0210603 A1 | 7/2014 | Walser | |
| 2014/0267175 A1* | 9/2014 | Hecht | G06F 3/0436 345/177 |
| 2014/0345367 A1 | 11/2014 | Mekid et al. | |

FOREIGN PATENT DOCUMENTS

GB 2534980 A * 8/2016 ........... G01L 3/1492

* cited by examiner

Primary Examiner — Hezron E Williams
Assistant Examiner — Marrit Eyassu
(74) *Attorney, Agent, or Firm* — Julia Voutyras; McCoy Russell LLP

(57) ABSTRACT

Methods and systems are provided for determining a fluid leakage of a vehicle component. In one example, a method may include measuring a strain of an underbody cover in order to determine the fluid leakage.

18 Claims, 5 Drawing Sheets

| DETERMINATION | S1 | S2 | S3 |
|---|---|---|---|
| ENGINE LEAK | .5 | .2 | .1 |
| NO LEAK | .1 | .1 | .1 |
| ENGINE AND TRANS. LEAK | .7 | .8 | .2 |
| TRANS. LEAK | .1 | .8 | .1 |
| NO LEAK | .5 | .5 | .5 |
| ENGINE, TRANS. AND RADIATOR LEAK | .8 | .8 | .8 |
| RADIATOR LEAK | .5 | .5 | .9 |

METHOD AND SYSTEM FOR DETECTING FLUID LEAK VIA A STRAIN GAUGE

FIELD

The present description relates generally to methods and systems for detecting a fluid leakage in a vehicle system.

BACKGROUND/SUMMARY

Automotive vehicles may include an underbody cover in order to decrease noise and provide sound insulation for drivers. However, with the introduction of underbody covers, an engine, a transmission, a charge air cooler (CAC), and other vehicle components may not have directly exposure from below to a road surface. Vehicle components may develop a leak due to vibrations caused due to driving, sudden thermal changes and/or expansion, and pressure changes.

If one of the above described components develops a fluid leak, then the fluid leak drips onto the underbody cover rather than the road surface. Thus, a driver may be unaware of the fluid leak. When left untreated, fluid leaks may degrade engine components and result in decreased vehicle performance. For example, if an engine is leaking engine coolant, the engine may overheat after a threshold amount of engine coolant has leaked from the engine.

Attempts to address monitoring a fluid leak include estimating a pressure drop across a conduit comprising a fluid. If the pressure drop is greater than a threshold pressure drop, then it may be determined that the conduit has developed a fluid leak. Other attempts to address finding a fluid leak include positioning an electric circuit on an underbody cover. One example approach is shown by Walser et al. in U.S. 20140210603. Therein, an electric circuit is located proximate to or underneath areas prone to developing fluid leaks. The electric circuit absorbs the fluid leak and moves from an open position to a closed position. In response to the electric circuit moving to the closed position, a notification and/or alarm is initiated in order to notify a driver of a fluid leak.

However, the inventors herein have recognized potential issues with such systems. As an example, the electric circuit described above relies on absorbing a portion of the fluid leakage in order to close its circuit. A direction of fluid leakage from a conduit and/or component may be difficult to estimate due to the mercurial nature of automotive driving (e.g., varying load, changing road conditions, temperature, wind, etc.). In this way, a fluid leak could develop without being sensed by the electric circuit.

In one example, the issues described above may be addressed by a method for determining a fluid leak of one or more vehicle components via a strain sensing element located underneath the vehicle components at an underbody cover. In this way, the strain sensing element may determine a fluid leakage based on a strain experienced by the underbody cover regardless of where the strain occurs on the underbody cover.

As one example, one or more strain sensing elements, such as strain gauges or piezoelectric devices, may be strategically positioned below areas prone to developing fluid leaks (e.g., underneath one or more of or each of an engine, a transmission, a radiator, and other accessory devices). A fluid leakage of an individual component may be determined via a strain measured by a strain gauge being greater than a threshold strain. The threshold strain may be based on a strain caused by a fluid dripping onto the underbody cover. The strain gauges may be calibrated such that strain caused due to driving, weather, etc. is not mistaken for a fluid leak. In one example, strain created by driving conditions may be treated a background strain measured by the strain gauge. In this way, a strain gauge may determine a fluid leak regardless of the leak occurring near the strain gauge or far from the strain gauge.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
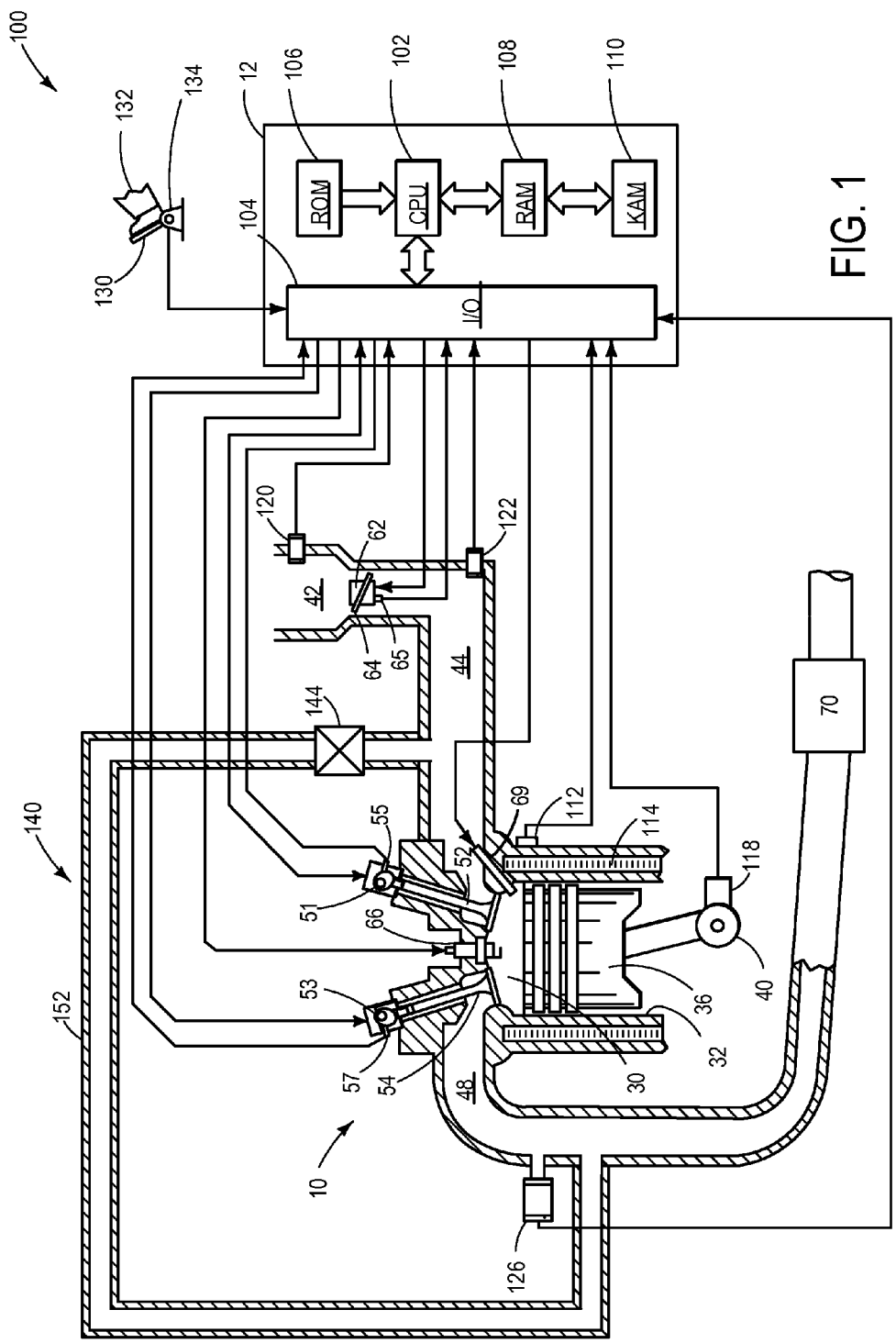
FIG. 1 shows an example engine with a single cylinder.
Figure 2A:
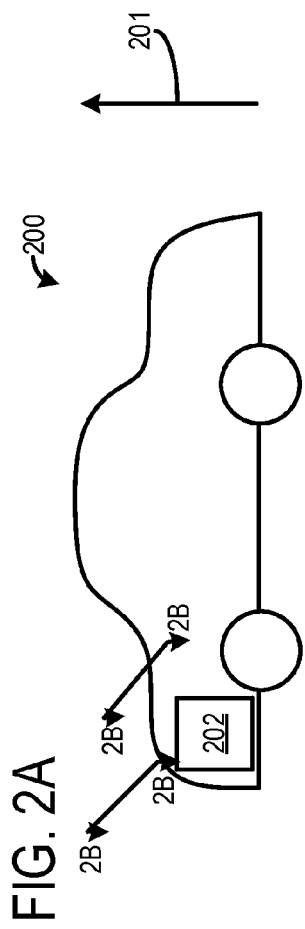
FIGS. 2A and 2B show an example vehicle and a cross-section of said vehicle depicting locations for a strain gauge on an underbody cover, respectively.
Figure 2B:
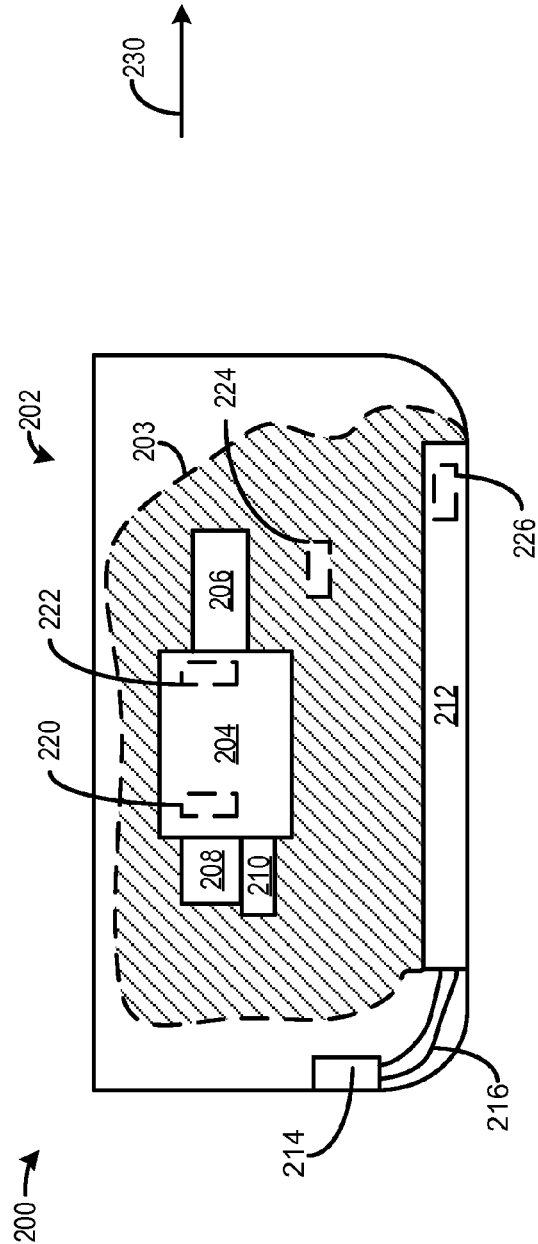
Figure 3A:
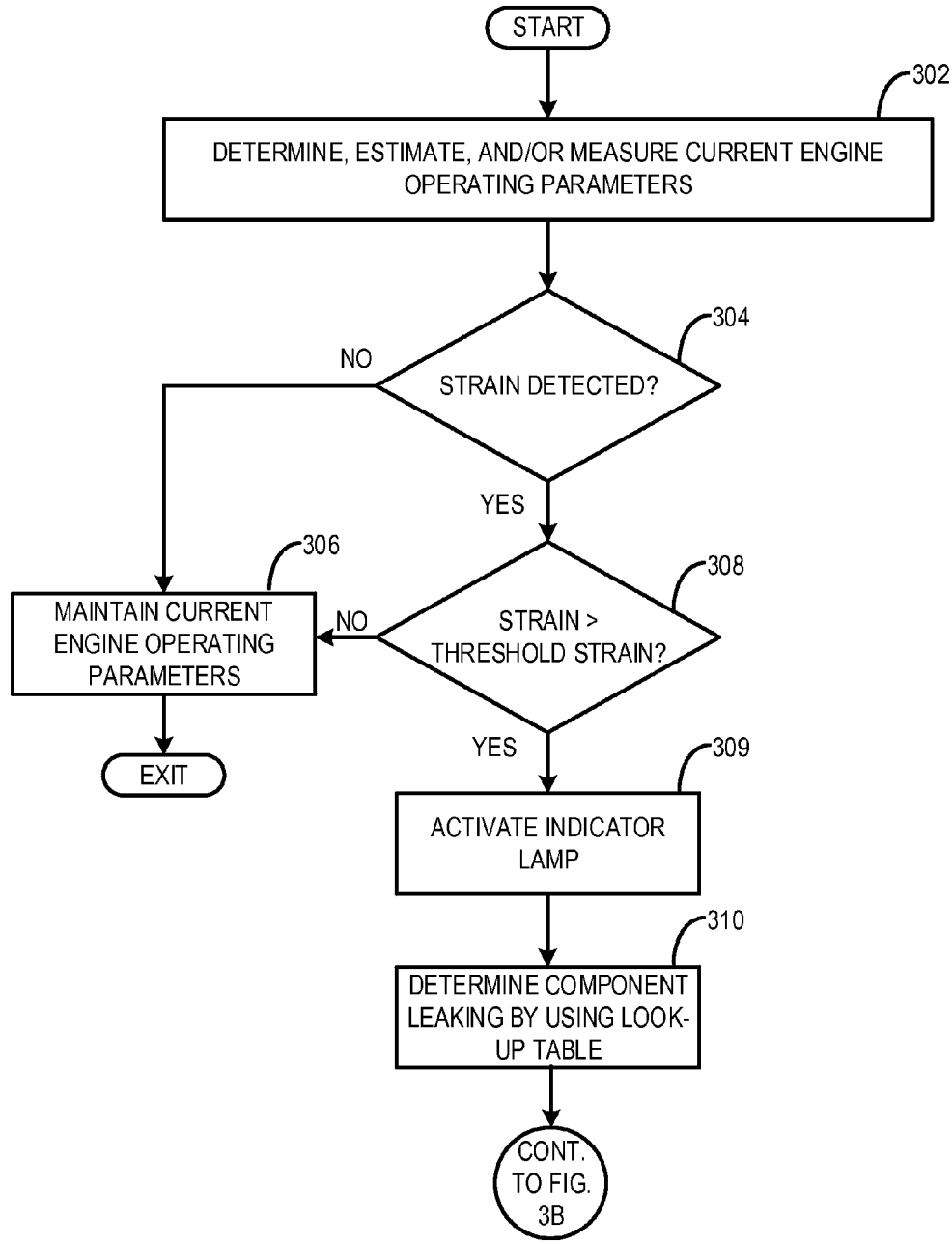
FIGS. 3A and 3B show a flow chart depicting a method for adjusting a component operation based on a detected leakage.
Figure 3B:
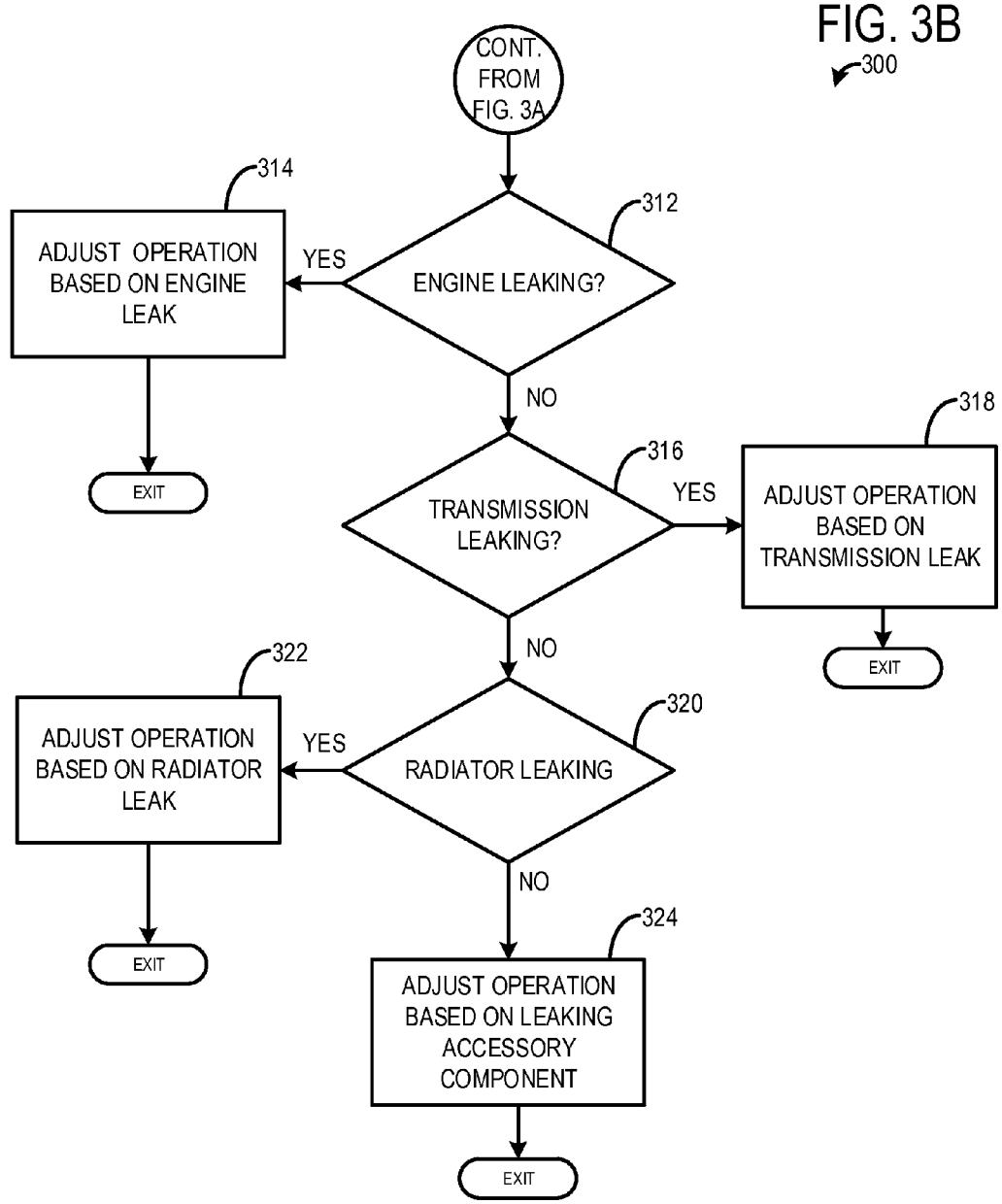
Figure 4:
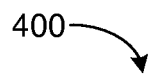
FIG. 4 shows a look-up table depicting determination of a type of vehicle component leaking based on strain values measured by a plurality of sensors.

The following description relates to systems and methods for determining a leakage of a vehicle component via one or more strain gauges located on an underbody of a vehicle. An engine comprising with a single cylinder and various other components capable of developing a leak is shown in FIG. 1. The engine may be used to propel a vehicle with an underbody cover, as shown in FIG. 2A. A cross-section of the engine with a radiator, transmission, drive accessories, and other components above an underbody cover with a plurality of strain gauges is shown in FIG. 2B. A method for determining a fluid leakage of the one or more components described above is shown with respect to FIGS. 3A and 3B. Example strain values from a look-up table along with component leakages corresponding to the example strain values are shown in FIG. 4.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

The controller 12 receives signals from the various sensors of FIG. 1 and employs the various actuators of FIG. 1 to adjust engine operation based on the received signals and instructions stored on a memory of the controller.

Turning now to FIG. 2A, a vehicle 200 with a vehicle system 202 is illustrated. The vehicle system 202 may comprise an engine. The engine may be substantially equal to engine 10 of FIG. 1. The vehicle system 202 may further comprise a transmission, a radiator, and other components, as described below. The vehicle 200 may comprise an underbody cover located below the vehicle system 202. The underbody cover may comprise strain gauges located up above the underbody cover and below the vehicle system 202. Arrow 201 depicts an up direction for a vehicle located on a flat surface. The strain gauges may be placed on the underbody cover such that they are located below areas prone to receiving fluid from a fluid leakage. Said another way, the engine, transmission, radiator, and other vehicle driving components are located up above the underbody cover and strain gauge(s). The fluid leakage may leak one or more of oil, coolant, washer fluid, brake fluid, fuel, power steering fluid, and transmission fluid.

A cross-section 2B of the vehicle 200 depicting a top-down view of the vehicle system 202 in more detail is shown with respect to FIG. 2B. The cross-section 2B may be a cross-section of the vehicle 200 of a flat surface. An outer body of the vehicle has been omitted in the cross-section 2B in order view components in the vehicle system 202.

Turning now to FIG. 2B, the cross-section 2B of the vehicle 200 is depicted. Components depicted with a solid line border are located above components with a dashed line border. As an example, an underbody cover 203 may be closer to a surface (e.g., a road) than an engine 204, that the vehicle 200 rests upon. The engine 204 may be substantially equal to the engine 10 of FIG. 1. FIG. 2B is illustrative by nature and other suitable components, additionally or alternatively, may be included in the vehicle system 202.

Cross-section 2B of the vehicle system 202 depicts the engine 204, a transmission 206, a front end accessory drive (FEAD) 208, a cooler 210, and a radiator 212. The vehicle system 202 may have one or more of coolant, oil, and fuel flowing in and out of the components listed above. The underbody cover 203 is further indicated via a dashed border with a diagonally striped interior. The vehicle system 202 further comprises a first strain gauge 220, a second strain gauge 222, a third strain gauge 224, and a fourth strain gauge 226. The strain gauges are further indicated via dashed borders. It will be appreciated that in some embodiments other suitable numbers of strain gauges may be used (e.g., five or more or less than four). Engine 204 may be substantially equal to engine 10 of FIG. 1. Arrow 230 indicates a right direction for a vehicle 200 located on a flat surface.

As shown, the engine 204, the transmission 206, the FEAD 208, the cooler 210, and the radiator are higher than and directly above the underbody cover 203. A degas bottle 214 and radiator conduit 216 are located higher than, but not directly above the underbody cover 203. In this way, if either the degas bottle 214 or the radiator conduit 216 develop a fluid leak, then the fluid leak may not contact a surface of the underbody cover 203. Thus, the underbody cover 203 may not experience a strain in response to a fluid leak of the degas bottle 214 or the radiator conduit 216.

An arrow 230 indicated a direction to the right of the vehicle 200 and the vehicle system 202. The first strain gauge 220 is located underneath a left portion of the engine 204 near the FEAD 208 and the cooler 210. The second strain gauge 222 is located below a right portion of the engine 204 near the transmission 206. The third strain gauge 224 is located between the transmission 206 and the radiator 212. The fourth strain gauge 226 is located below a right portion of the radiator 212. The first, second, third, and fourth strain gauges 220, 222, 224, and 226 are physically coupled to a top side of the underbody cover 203 such that the underbody cover 203 lies between the strain gauges and a driving surface. Said another way, the first, second, third, and fourth strain gauges 220, 222, 224, and 226 are located between the underbody cover 203 and the components of the vehicle system 202 (e.g., the engine 204, the transmission 206, etc.). The first, second, third, and fourth strain gauges 220, 222, 224, and 226 are calibrated such that strain created by driving conditions, weather, etc. is not mistaken for a fluid leakage. In some embodiments, the first, second, third, and fourth strain gauges 220, 222, 224, and 226 may be coupled to a bottom side of the underbody cover 203 such that the underbody cover 203 lies between the first, second, third, and fourth strain gauges 220, 222, 224, and 226 and the vehicle system 202.

Each of the first, second, third, and fourth strain gauges 220, 222, 224, and 226 may measure a different strain magnitude, where the strain magnitude measured is based on a distance between a strain epicenter and a single strain gauge. For example, if the cooler 210 is leaking, then the first strain gauge 220 may measure the largest strain, the second strain gauge 222 may measure the second largest strain, and the third strain gauge 224 and the fourth strain gauge 226 may measure the smallest strain or no strain at all. Therefore, a magnitude of the strain measured may be proportional to a distance between the strain gauge and the component leaking fluid. For example, as the distance decreases, the strain detected increases.

The first strain gauge 220 may be used to detect a fluid leakage of the left portion of the engine 204, the FEAD 208, and the cooler 210. Components in the left portion of the engine 204 may include a cylinder bank including three or more cylinders, an intake manifold, an exhaust manifold, and various oil pumps and/or coolant pumps. The FEAD 208 may include fuel pumps, lubricating oil pumps, and hydraulic pumps. The cooler 210 may be a charge air cooler (CAC), an exhaust gas recirculation (EGR) cooler, a heater core, or any other suitable heat transfer device.

The first strain gauge 220 may detect a leakage of at least the left portion of the engine 204, the FEAD 208, and the cooler 210 via measuring a strain of the underbody cover 203 being greater than a strain threshold. The strain threshold may be constant value (e.g., 0.4).

As an example, the first strain gauge 220 may measure a leakage of the cooler 210 via detecting a strain of the underbody cover 203 exceeding the strain threshold caused by a fluid spilling onto the underbody cover 203. In such an example, the second strain gauge 222 may also detect a strain of the underbody cover 203 in response to the fluid leakage. However, due to a proximity of the first strain gauge 220 to the cooler 210, the first strain gauge 220 may measure a larger strain than the strain measured by the second strain gauge 222. In such an example, the first strain gauge 220 is closer to a strain epicenter and may be used to more accurately determine which vehicle system 202 component is leaking. The first strain gauge 220 may then signal to a controller (e.g., controller 12) a leakage has occurred. Detecting a leakage and determining which component of the vehicle system 202 is leaking will be discussed in greater detail below with respect to FIGS. 3A and 3B.

The second strain gauge 222 may be used to detect a leakage of at least the right portion of the engine 204 and the transmission 206. The right portion of the engine 204 may comprise a cylinder bank of three of more cylinders, an intake manifold, an exhaust manifold, and various oil and/or coolant pumps. The second strain gauge 222 may detect fluid leaks in a manner similar to that described for the first strain gauge 220.

As an example, the second strain gauge 222 may detect a leakage of a left portion of the transmission 206 by measuring a strain of the underbody cover 203 exceeding the strain threshold. However, the third strain gauge 224 may also measure the strain, albeit at a lesser magnitude (e.g., the second strain gauge 222 measures a greater strain of the underbody cover 203 than the third strain gauge 224). As a result, the second strain gauge may be used to determine which component of the vehicle system 202 is leaking. The determination may be based on strain values in a look up table at various engine loads.

The third strain gauge 224 may be used to detect at least a leakage of various coolant and/or oil passages. The passages may connect the radiator 212 to the engine 204 or to the transmission 206. Passage connections between various components may weaken due to vibrations and other disturbances caused by driving. As these connections weaken, a likelihood of a fluid leakage increases. Thus, the third strain gauge 224 is positioned such that it may detect when a leakage of one of the aforementioned passages occurs.

As an example, a cooling sleeve (e.g., cooling sleeve 114 of FIG. 1) may be fluidly coupled to the radiator 212. Thus, a coolant conduit traverses a distance between the engine 204 and the radiator 212. The coolant conduit may lie directly above or proximal to the third strain gauge 224. As another example, the third strain gauge 224 may determine a fluid leakage of a right portion of the transmission 206.

The fourth strain gauge 226 may detect a fluid leakage of the radiator 212. The radiator 212 may develop a leak due to thermal strain and/or vibrations caused during vehicle operation. The radiator 212 may leak one or more of engine oil and engine coolant, both of which are detectable by the fourth strain gauge 226.

FIGS. 2A and 2B show an example configuration with relative positioning of various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

FIGS. 2A and 2B illustrated an underbody cover of a vehicle physically coupled to a plurality of strain gauges located below a vehicle system. The strain gauges are able to detect a strain of the underbody cover created by a fluid leakage of one or more components of the vehicle system. FIGS. 3A and 3B illustrate a method for determining a leakage and attributing the leakage to an individual component of the vehicle system.

Turning now to FIG. 3, a method 300 for determining a leakage of one or more vehicle system components is illustrated. Instructions for carrying out method 300 and a method 400 included herein may be executed by a controller (e.g., controller 12) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 may be applied to systems depicted with respect to FIGS. 1 and 2. Specifically, the method 300 may use the first strain gauge 220, the second strain gauge 222, the third strain gauge 224, and the fourth strain gauge 226 in conjunction with controller 12 to determine a fluid leakage of one or more vehicle system 202 components described above.

The method 300 begins at 302 where the method 300 includes determining, estimating, and/or measuring current engine operating parameters. The current engine operating parameters may include one or more of an engine load, an engine temperature, a manifold vacuum, a vehicle speed, and an air/fuel ratio.

At 304, the method 300 includes determining if a strain was detected by one or more strain gauges. Strain may be detected in response to an expansion or retraction of an underbody cover located below the vehicle system. For example, if an engine (e.g., engine 10 of FIG. 1) develops a fluid leak, then the fluid leak may drip fluid onto the underbody cover, creating a strain. The strain may be measured by a strain gauge. If no strain is detected, then the method 300 proceeds to 306 to maintain current engine operations and does not indicate a fluid leak.

If a strain is detected by one or more strain gauges, then the method 300 proceeds to 308 to determine if the strain is greater than the threshold strain. If the strain is not greater than the threshold strain, then the method 300 proceeds to 306, as described above. A strain being less than threshold strain may be a strain detected due to vehicle driving and/or road conditions. As described above, the threshold strain may be adjustable based on an engine temperature and/or engine load. As described above, the threshold strain may decrease in response to an increasing engine temperature and/or engine load.

If the strain detected is greater than the threshold strain, then the method 300 proceeds to 309 to activate an indicator lamp to inform a driver of the fluid leakage. Activating the indicator lamp may be accompanied by an audible sound (e.g., ring, beep, ding, bell, etc.) in order to notify the driver of the fluid leakage.

As an example, with reference to FIG. 2B, a leakage of the cooler 210 may be determined via the first strain gauge 220. A controller (e.g., controller 12) may attribute the leakage detected to the cooler 210, and not to the engine 204 and the FEAD 208 based on a magnitude of the strain detected. The magnitude of the strain detected may increase as distance between a strain gauge and a strain epicenter (e.g., point of contact between fluid leak and the underbody cover) decreases. For example, due to a proximity of the engine 204 to the first strain gauge 220, a fluid leakage from the engine 204 may produce a greater magnitude strain than a strain produced by the cooler 210 leaking fluid.

At 310, the method 300 includes determining which vehicle component(s) is leaking by using a look-up table. The look-up table may include strain values at various engine temperatures and/or loads associated with leakage of a particular vehicle system component. For example, a data entry for a leakage of the cooler 210 of FIG. 2B may include a strain magnitude measured by the first strain gauge 220, a second strain gauge (e.g., second strain gauge 222 of FIG. 2B), a third strain gauge (e.g., the third strain gauge 224 of FIG. 2B), and a fourth strain gauge (e.g., fourth strain gauge 226 of FIG. 2b) at a specific engine load and operation. The engine 204, transmission 206, FEAD 208, and radiator 212 may all have similar data entries in the look-up table. In this way, the method 300 may identify which component of the vehicle system is leaking based on the strain magnitude measured by one or more strain gauges physically coupled to the underbody cover by comparing the strain magnitude to values in the look-up table.

At 312, the method 300 includes adjusting operation of the leaking vehicle component and activating an indicator lamp. For example, if a radiator is leaking either coolant or oil, a torque output of the engine may be reduced in order to decrease thermal stress and decrease emissions. The adjustments may be reversed upon correction of the leakage. The indicator lamp may be activated in order to alert a driver of the leakage and notify them to correct the leakage. The adjustments of vehicle components will be described in greater detail below with respect to FIG. 3B.

Continuing to FIG. 3B, a continuation of the method 300 is illustrated. At 312 the method 300 includes determining if the engine is leaking. The engine may be leaking if a strain gauge corresponding to the engine (e.g., first strain gauge 220 and second strain gauge 222 of FIG. 2B) measures a strain larger than the threshold strain, as described above. A corresponding strain gauge may be defined as a strain gauge nearest a leaking component. The strain may be compared to entries in the look-up table corresponding to an engine leakage at similar vehicle conditions. If the strain measured is substantially equal to an engine leak entry in the look-up table, then the method 300 proceeds to 314 to adjust engine operation based on the engine leak.

For example, the adjustments in response to the engine leak may include one or more of decreasing a torque output, decreasing a primary injection pressure, advancing injection timing, and decreasing boost in order to reduce a temperature of the engine. The method 300 may adjust engine operations in order to decrease a temperature of the engine due to the engine potentially leaking either a coolant or an oil. By reducing a temperature of the engine, an increase in thermal stress experienced by the engine in response to the coolant or oil leak may be mitigated. It will be appreciated by someone skilled in the art that other suitable adjustments may be implemented in order to decrease the engine temperature.

Returning to 312, if the method 300 determines that the engine is not leaking, then the method 300 proceeds to 316 to determine if the transmission is leaking. The transmission may be leaking if a strain gauge corresponding to the transmission (e.g., the second strain gauge 222 or the third strain gauge 224 of FIG. 2B) measures a strain corresponding to an entry in the look-up table for transmission fluid leakage. For example, if the strain is measured at a high load, then the strain is compared to an entry relating to strain created by a transmission fluid leakage at high load.

If the transmission is leaking, then the method 300 proceeds to 318 to adjust vehicle operation based on the transmission leak. As an example, the adjustments in response to the transmission leak may include decreasing a transmission gear below a threshold gear (e.g., third gear). For example, the transmission gear may be decreased in order to reduce a thermal stress experienced by the transmission in response to the fluid leakage.

Returning to 316, if the transmission is not leaking fluid, then the method 300 proceeds to 320 to determine if the radiator is leaking. The radiator may be leaking if a strain gauge corresponding to the radiator (e.g., the fourth strain gauge 226 of FIG. 2B) measures a strain corresponding to a radiator leak data entry in the look-up table.

If the radiator is leaking, then the method 300 proceeds to 322 to adjust vehicle operation based on the radiator leaking. As an example, the adjustments may include one or more of disabling coolant flow to the radiator and adjustments described above at 314. In one example, by disabling coolant flow to the radiator, the coolant may be circulated to only a heater core fluidly coupled to the engine. The heater core may allow heat transfer between coolant and ram air such that the coolant may decrease in temperature and provide a cooling means to the engine while the radiator has a fluid leakage.

Returning to 320, if the radiator is not leaking fluid, then the method 300 proceeds to 324 to adjust vehicle operation based on an accessory component leaking. The accessory component may be one or more of a front end accessory drive (FEAD), a cooler, a conduit, a heater core, etc. The accessory component(s) may be leaking if a corresponding strain gauge (e.g., one or more of first strain gauge 220, second strain gauge 222, third strain gauge 224, and fourth strain gauge 226 of FIG. 2B) measures a strain magnitude corresponding to an individual accessory component leak data entry in the look-up table. For example, for the cooler, the first strain gauge may be the corresponding strain gauge to determine if the cooler is leaking.

As an example, the method 300 may decrease boost in response to a charge air cooler (CAC) leaking fluid. As another example, in response to an exhaust gas recirculation (EGR) cooler leaking fluid, the method 300 may reduce EGR. Engine operation may be adjusted in response to the decreased EGR. The adjustments to the engine operation may include one or more of increasing an air/fuel ratio, decreasing an injection pressure, and advancing an injection timing.

Thus the method 300 may provide a routine for determining leakage of one or more vehicle components and altering a vehicle operation in order to prevent further degradation to the leaking component. The method 300 determines which component is leaking based on measurement of a nearest strain gauge matching an entry in a look-up table.

FIGS. 3A and 3B depicts a method for measuring a strain of an underbody cover and determining which vehicle system component is leaking FIG. 4 depicts a look-up table illustrating varying strain values along with a determination of whether or not a vehicle system component is leaking.

Turning now to FIG. 4, a look-up table 400 depicts strain values for a first strain gauge (S1), a second strain gauge (S2), and a third strain gauge (S3) for a variety of vehicle conditions (e.g., fluid leak and no fluid leak). A determination of a vehicle component leaking may be based on comparing strain values measured by S1, S2, and S3 to values stored in the look-up table 400 as described above with respect to method 300 of FIGS. 3A and 3B. For example, a location of one or more leakages and an amount of the one or more leakages may be determined via a plurality of strain gauges measuring strain values and comparing the strain values to data stored in the look-up table 400 and/or to each other.

S1 may be located below a central portion of an engine (e.g., 10) at an underbody cover (e.g., on top or below the underbody cover). S2 may be located below a central portion of a transmission at the underbody cover. S3 may be located below a central portion of a radiator at the underbody cover. In this way, a leakage of the engine may result in S1 measuring the largest strain value, while S2 and S3 measure lesser strain values of the underbody cover. Thus, S2 may measure the largest strain value if the transmission is leaking and S3 may measure the largest strain value if the radiator is leaking.

The engine may be leaking fluid if S1 measures a strain value of 0.5, S2 measures a strain value of 0.2, and S3 measures a strain value of 0.1, as depicted when comparing the above values to values indicated in the look-up table 400. The strain value may be based on a distance between a strain gauge and a location of where the strain developed (e.g., a strain epicenter), as described above. For example, if S1 is nearest to the location of where the strain developed, then S1 may measure the largest strain value. If S1 measures the largest strain value, then it may be determined the engine is leaking A maximum strain value measured may be substantially equal to 1.0.

A threshold strain may be equal to a strain value of 0.4. S1 measuring a strain value greater than the threshold strain (e.g., 0.5>0.4), along with S2 and S3 measuring strain values less than the threshold strain corresponds to the engine leaking S2 and S3 are farther away from the engine than S1 and thus measure lower strain values. A controller (e.g., controller 12) may adjust vehicle operation in response to the determination of the engine leaking, as described above (e.g., decrease boost, decrease injection pressure, etc).

If S1, S2, and S3 measure strain values equal to 0.1, then no leak is determined due to none of the strain values exceeding the threshold strain. S1, S2, and S3 may measure strain values equal to 0.1 due to driving conditions (e.g., weather, road conditions, etc).

Both the engine and the transmission are leaking if S1 measures a strain value of 0.7, S2 measures a strain value of 0.8, and S3 measures a strain value of 0.2. Both S1 and S2 measure relatively high strain values of 0.7 and 0.8, respectively. This may be due to the strain caused by the engine leak and the strain caused by the transmission leak influencing one another. As described above, the engine leak caused S1 to measure a strain value of 0.5. However, when both the transmission and the engine leak, the strains may be constructive (e.g., positively influence one another) and cause the underbody cover to experience a greater strain than it would if only one component was leaking.

The transmission is leaking if S1 measures a strain value of 0.1, S2 measures a strain value of 0.8, and S3 measures a strain value of 0.1. The strain value measured by S2 may be relatively high due a proximity of the leakage to S2. As described above, a strain gauge may measure an increased strain of the underbody cover (e.g., stretch or compression) as the distance between the location of the strain (e.g., leakage) and the strain gauge decreases.

No leak is occurring if S1 measures a strain value of 0.5, S2 measures a strain value of 0.5, and S3 measures a strain value of 0.5. Despite all the strain gauges measuring a strain value greater than the strain threshold, no leak is determined due to all the strain values being equal to one another. Since the strain values are all equal and near to the strain value (e.g., 0.4) of the strain threshold, then the strain may not be attributed to a single component fluid leak, which would likely cause a single strain gauge to measure a higher strain value than other strain gauges. If one or more components were leaking, then the strain values would either all be unequal or mutually influenced such that the strain values measured would be over an upper strain threshold (e.g., 0.75). The upper strain threshold may be based on a strain experienced by the underbody cover when one or more components are leaking. The equal strain values for S1, S2, and S3 may be attributed to road conditions (e.g., driving over a bump, pothole, curb, etc.).

The engine, the transmission, and the radiator are leaking if S1 measures a strain value of 0.8, S2 measures a strain value of 0.8, and S3 measures a strain value of 0.8. The strain values measured by S1, S2, and S3 exceed the upper strain threshold due to increased strain influencing from multiple fluid leaks. For example, if the engine leaks, the strain created may influence a strain value measured by S3, despite S3 not corresponding to the engine. Thus, if the engine, the transmission, and the radiator are leaking, relatively high strain values may be measured by S1, S2, and S3 that exceed the upper strain threshold.

The radiator is leaking if S1 measures a strain value of 0.5, S2 measures a strain value of 0.5, and S3 measures a strain value of 0.9. Although both the strain value measured by S1 and S2 exceed the strain threshold, the strain value measured by S3 is indicative of a relatively large strain created by a high volume fluid leak. Thus, the influencing of the leak is increased. The relatively high strain value may be due to a fluid pipe becoming loose and releasing a large volume of fluid.

The examples described above with respect to FIG. 4 are illustrative by nature and other values may be measured in order to determine fluid leaks of the engine, the transmission, and/or the radiator. Furthermore, as described above, the strain values measured by the strain gauges are compared to values stored in the look-up table 400 in order to determine which vehicle system component is leaking.

In this way, a driver may be informed of a vehicle component leaking fluid. As the fluid leaks from the component, it falls onto an underbody cover. The underbody cover slightly expands and a strain gauge physically coupled to the underbody cover senses the expansion (e.g., strain). A leak may be identified based a strain gauge measuring a strain of the underbody cover exceeding a threshold strain. Additionally, the leak may be attributed to a vehicle component based on data entries in a look-up table. Each component comprises a plurality of entries regarding a strain created based on a leakage of the component under a certain engine operation (e.g., varying load, boost, injection pressure, etc).

The technical effect of placing strain gauges on an underbody cover is to allow a driver to be notified if a vehicle fluid leakage has occurred. The fluid leakage creates a strain on the underbody cover which may be measured by one or more strain gauges. A strain gauge nearest the leaking component may measure the largest magnitude strain. If the largest magnitude strain is greater than a threshold strain, then the strain may be attributed to a fluid leakage. Furthermore, the largest magnitude strain may be compared to strain values in a look-up table in order to identify which vehicle component is leaking.

A method comprising determining a fluid leak of one or more vehicle components via a plurality of strain gauges located underneath the vehicle components on an underbody cover. The method includes determining the fluid leak is based on a strain of the underbody cover exceeding a threshold strain. The threshold strain is adjusted based on an engine temperature. Each of the plurality of strain gauges measures a different strain magnitude, where the strain magnitude measured is based on a distance between a strain epicenter and a single strain gauge. The method, additionally or alternatively, further includes identifying which vehicle component is leaking based on a strain magnitude measured by a strain gauge nearest the vehicle component. The method includes adjusting a vehicle operation based on the identified vehicle component leaking. For example, if the engine is identified as leaking, peak engine output may be reduced to a first threshold and the engine output limited to said first threshold. If the radiator is identified as leaking, peak engine output may be reduced to a second threshold lower than the first and the engine output limited to said second threshold. In this way, different actions are taken depending on which component is identified as leaking. The plurality of strain gauges are located underneath one or more of an engine, a transmission, and a radiator.

A second method comprising placing one or more strain gauges on an underbody cover below one or more of an engine, a transmission, and a radiator. The method further including determining a leakage of one or more of the engine, the transmission, and the radiator based on a strain detected via a corresponding strain gauge. The method further includes the corresponding strain gauge is a strain gauge nearest one or more of the engine, the transmission, and the radiator. The method, additionally or alternatively, further includes identifying if the engine, the transmission, or the radiator is leaking based on entries in a look-up table. The entries in the look-up table include strain values of the underbody cover based on the engine, the transmission, or the radiator leaking at a given vehicle operation. The method further comprises adjusting a vehicle operation in response to identifying which of the engine, the transmission, or the radiator is leaking. The adjusting in response to the engine leaking includes one or more of decreasing a torque output, decreasing boost, and advancing an injection timing. The adjusting, additionally or alternatively, is further in response to the transmission leaking includes one or more of decreasing a transmission gear. The adjusting is further in response to the radiator leaking includes one or more of decreasing a torque output, decreasing boost, and advancing an injection timing.

A system comprising first, second, third, and fourth strain gauges are vertically displaced underneath one or more of an engine, a transmission, and a radiator on an underbody cover. The system further includes a controller with computer readable instructions for determining a fluid leakage in response to a strain gauge measuring a strain of the underbody cover exceeding a threshold strain. The controller further comprises instructions for adjusting a vehicle operation based on a strain detected by either the first, second, third, or fourth strain gauge. The first strain gauge is located underneath the engine and proximal to the engine, a front end accessory drive, and a cooler, the second strain gauge is located underneath an opposite side of the engine compared to the first strain gauge and proximal to the transmission and the engine, the third strain gauge is located between the transmission and the radiator, and the fourth strain gauge is located underneath and proximal to the radiator. The fluid leakage leaks one or more of oil, coolant, washer fluid, brake fluid, fuel, power steering fluid, and transmission fluid. The controller activates an indicator lamp in response to the strain exceeding the threshold strain. The controller activates an indicator lamp in response to the strain exceeding the threshold strain Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during combustion operation in an engine, determining a fluid leak of a component including one or more of the engine with a combustion chamber, a transmission, and a radiator in a wheeled vehicle via a strain sensing element located underneath the component in an underbody cover positioned below and spaced away from the component and included in the wheeled vehicle; and
   adjusting a vehicle operation in response to determining the fluid leak in the engine, the transmission, or the radiator;
   where adjusting the vehicle operation includes one or more of decreasing a torque output and decreasing boost.

2. The method of claim 1, wherein determining the fluid leak is based on a strain of the underbody cover exceeding a threshold strain, wherein the strain sensing element is positioned on an underside surface of the underbody cover.

3. The method of claim 2, wherein the threshold strain is adjusted based on an engine temperature, and wherein the strain sensing element is positioned directly on an upper or lower surface of the underbody cover.

4. The method of claim 1, wherein the strain sensing element measures a different strain magnitude, where the strain magnitude measured is based on a distance between a strain epicenter and the strain sensing element.

5. The method of claim 4, further comprising identifying which vehicle component is leaking based on the strain magnitude measured by the strain sensing element.

6. A method, comprising:
receiving signals from a plurality of strain gauges on an underbody cover positioned below and spaced away from one or more of an engine, a transmission, and a radiator and included in a wheeled vehicle, during combustion operation in the engine;
determining a leakage of one or more of the engine, the transmission, and the radiator based on the signals received from a corresponding strain gauge, the corresponding strain gauge being a strain gauge in the plurality of strain gauges; and
adjusting a vehicle operation in response to identifying which of the engine, the transmission, or the radiator is leaking;
where adjusting the vehicle operation includes one or more of decreasing a torque output and decreasing boost.

7. The method of claim 6, wherein the corresponding strain gauge is a strain gauge nearest one or more of the engine, the transmission, and the radiator.

8. The method of claim 6, further comprising identifying if the engine, the transmission, or the radiator is leaking based on entries in a look-up table.

9. The method of claim 8, wherein the entries in the look-up table include strain values of the underbody cover based on the engine, the transmission, or the radiator leaking at a given vehicle operation.

10. The method of claim 6, wherein the adjusting in response to the engine leaking includes advancing an injection timing.

11. The method of claim 6, wherein adjusting the vehicle operation in response to the transmission leaking includes decreasing a transmission gear.

12. The method of claim 6, wherein the adjusting in response to the radiator leaking includes advancing an injection timing.

13. A system, comprising:
first, second, third, and fourth strain gauges vertically displaced underneath and spaced away from one or more of an engine, a transmission, and a radiator on an underbody cover of a wheeled vehicle; and
a controller with computer readable instructions stored in memory for:
determining a fluid leakage in response to a strain gauge measuring a strain of the underbody cover exceeding a threshold strain, during combustion operation in the engine; and
adjusting a vehicle operation in response to identifying which of the engine, the transmission, or the radiator is leaking.

14. The system of claim 13, wherein the controller further comprises computer readable instructions stored in memory for adjusting a vehicle operation based on a strain detected by either the first, second, third, or fourth strain gauge.

15. The system of claim 14, wherein the first strain gauge is located underneath the engine and is proximal to the engine, a front end accessory drive, and a cooler, the second strain gauge is located underneath an opposite side of the engine compared to the first strain gauge and is proximal to the transmission and the engine, the third strain gauge is located between the transmission and the radiator, and the fourth strain gauge is located underneath and proximal to the radiator.

16. The system of claim 14, wherein the fluid leakage is one or more of an oil, coolant, washer fluid, brake fluid, fuel, power steering fluid, and transmission fluid leak.

17. The system of claim 14, wherein the controller includes computer readable instructions stored in memory for activating an indicator lamp in response to the strain exceeding the threshold strain.

18. The system of claim 14, where adjusting the vehicle operation includes one or more of decreasing torque output, decreasing boost, and advancing an injection timing in the engine.

* * * * *